UNITED STATES PATENT OFFICE.

GEORGE T. HOLLOWAY, OF LONDON, ENGLAND.

PROCESS FOR THE PREPARATION OF COMMON SALT FOR DOMESTIC AND OTHER USES.

No. 902,403.

Specification of Letters Patent.

Patented Oct. 27, 1908.

Application filed January 2, 1906. Serial No. 294,245.

*To all whom it may concern:*

Be it known that I, GEORGE THOMAS HOLLOWAY, a subject of the King of Great Britain and Ireland, residing at London, England, (whose post-office address is 57 and 58 Chancery Lane, London, W. C., England,) have invented a certain new and useful Process for the Preparation of Common Salt for Domestic and other Uses, of which the following is a specification.

This invention realtes to the preparation of common salt so that its tendency to cake on exposure shall be precluded. This caking is, as is well known, due to the presence of the chlorids and other deliquescent salts of calcium and magnesium, and the present invention consists in coating the prepared granules or cyrstals of common salt with finely powdered carbonate of soda for the purpose of converting the deliquescent chlorid or other compound of calcium or magnesium at or near the surface of the crystals or granules only into the non-deliquescent carbonate.

In the manufacture of common salt it has long been known to add sodium carbonate to the brine before the common salt is crystallized out. It is however found that the comparatively pure salt thus produced still cakes together on keeping. Furthermore it is known to grind common salt with carbonate of soda so that the re-action with the calcium and magnesium salts takes place in the solid state, but to produce a salt which is practically a non-caking salt by such a process, an amount of the carbonate must be employed decidedly in excess of that theoretically necessary to decompose the deliquescent calcium and magnesium salts; while, moreover, salt thus prepared still cakes together to the same extent on keeping.

According to the invention a relatively small quantity of carbonate of soda is used which by being coated on the prepared crystals or granules effects the conversion of the deliquescent compounds at or near the surface only. When however the prepared salt is dissolved in water or used as a condiment the solution of the carbonate and common salt takes place simultaneously and precipitation of the calcium and magnesium salts as carbonates is immediate, so that the actual quality of the salt is the same as though the chemical reaction had actually taken place during the process of preparation.

In carrying out my invention, the carbonate of soda, which may be either the normal anhydrous carbonate or the bicarbonate or other of the ordinary forms of carbonate, is ground to a fine powder. The salt is ground or rubbed down to a sufficient degree of fineness to pass through an ordinary reasonably fine sieve, say one having about 30 or 40 holes to the linear inch and is then sifted on a sieve having a larger number of holes (*i. e.* of small aperture) say 100 holes per linear inch, and the salt which does not pass through such finer sieve, is employed for my process. Such coarser salt is agitated without grinding, with so much of the finely ground carbonate of soda as is sufficient to precipitate the whole or a proportion of the calcium and magnesium which is present, as carbonate, the agitation being sufficiently prolonged to insure that the carbonate shall be well distributed upon and among the salt particles.

The salt, if damp, is dried before admixture with the carbonate as my invention consists in coating the particles with the carbonate and not necessarily in producing any chemical change other than such as takes place from mere contact at the surface of the salt particles.

I find that the theoretical quantity of carbonate of soda or even less, is generally sufficient to produce a non-caking salt but I find that, with some varieties of salt, it is best to first mix the finely ground carbonate of soda with a proportion of the original salt which passed through the fine sieve, or with salt which has been still more finely ground (say one part of carbonate by weight with ten parts by weight of such salt) before mixing it with the coarser salt as this insures a more regular distribution of the carbonate over the salt particles while still leaving the final product distinctly granular.

I find that, with ordinary kitchen and other commercial salt as sold for domestic use etc. one part by weight of ordinary anhydrous carbonate of soda is sufficient for the treatment of one hundred parts by weight of the salt. Correspondingly more may, however, be used if the proportion of deliquescent calcium and magnesium compounds in the salt exceed the normal amount.

The formation of the carbonates of calcium and magnesium is, of course coincident with the formation of an equivalent amount of sodium chlorid from the carbonate of soda used so that the final product may be actually richer in sodium chlorid than was the salt from which it was prepared.

What I claim as my invention and desire to secure by Letters Patent is:—

The process of preparing a table salt which consists in producing a dry granulated body of salt having granules of substantially uniform size, and coating said granules with a thin filmiform coating of finely powdered sodium carbonate.

In testimony whereof I have hereunto signed my name to this specification in the presence of two subscribing witnesses.

GEORGE T. HOLLOWAY.

Witnesses:
GEORGE E. HUNT,
H. D. JAMESON.